(12) United States Patent
Bieleń et al.

(10) Patent No.: US 11,049,637 B2
(45) Date of Patent: Jun. 29, 2021

(54) POLE PIECE FOR A TORQUE MOTOR (71) Applicant: Hamilton Sundstrand Corporation, Charlotte, NC (US)

(72) Inventors: Michał Bieleń, Wrocław (PL); Jakub Sobol, Wrocław (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 274 days.

(21) Appl. No.: 16/124,828

(22) Filed: Sep. 7, 2018

(65) Prior Publication Data

US 2019/0080832 A1 Mar. 14, 2019

(30) Foreign Application Priority Data

Sep. 8, 2017 (EP) .................................. 17461600

(51) Int. Cl.
*H01F 7/14* (2006.01)
*H02K 26/00* (2006.01)
*H02K 21/14* (2006.01)

(52) U.S. Cl.
CPC ............. *H01F 7/145* (2013.01); *H02K 26/00* (2013.01); *H02K 21/145* (2013.01)

(58) Field of Classification Search
CPC ....... H01F 7/145; H02K 26/00; H02K 21/145
See application file for complete search history.

(56) References Cited

U.S. PATENT DOCUMENTS

| 2,962,611 A | * | 11/1960 | Atchley | H01F 7/14 310/29 |
| 3,434,083 A | | 3/1969 | Lewis | |
| 3,437,101 A | * | 4/1969 | Kubilos | F15B 13/16 137/83 |
| 3,447,111 A | * | 5/1969 | Kubilos | H02K 26/00 335/230 |
| 3,473,547 A | * | 10/1969 | Coakley | F15B 13/0436 137/83 |
| 3,556,150 A | * | 1/1971 | King | F15B 13/0438 137/625.4 |
| 3,612,103 A | * | 10/1971 | Waddington | F15B 13/0436 137/625.63 |
| 4,403,204 A | * | 9/1983 | Crawshaw | H01F 7/14 335/229 |
| 5,004,940 A | | 4/1991 | Vanderlaan | |

(Continued)

FOREIGN PATENT DOCUMENTS

DE  19906445 A1  8/2000
EP  0461490 A1  12/1991

(Continued)

OTHER PUBLICATIONS

Extended European Search Report for International Application No. 17461600.3 dated Mar. 15, 2018, 8 pages.

*Primary Examiner* — Mohamad A Musleh
(74) *Attorney, Agent, or Firm* — Cantor Colburn LLP (57) ABSTRACT

There is provided a pole-piece for a torque motor, the pole-piece comprising a first section formed separate from a second section, wherein the first section and the second section are configured to abut each other to form one or more lines of abutment on an outer surface thereof, and each line of abutment follows an S- or Z-shape when the first section abuts the second section.

3 Claims, 5 Drawing Sheets

(56) References Cited

U.S. PATENT DOCUMENTS

| | | | |
|---|---|---|---|
| 5,283,492 A * | 2/1994 | Mason | H02K 16/02 310/112 |
| 5,679,989 A * | 10/1997 | Buscher | H02K 26/00 29/596 |
| 6,344,702 B1 | 2/2002 | Rodriguez et al. | |
| 7,423,506 B2 * | 9/2008 | Terasaki | H01F 7/021 335/281 |
| 2015/0270748 A1 * | 9/2015 | de la Chevasnerie | H02K 1/18 310/154.11 |
| 2016/0049230 A1 * | 2/2016 | Cichon | H01F 7/081 251/30.01 |
| 2019/0081542 A1 * | 3/2019 | Bielen | H02K 1/17 |

FOREIGN PATENT DOCUMENTS

| | | | |
|---|---|---|---|
| EP | 1168382 A1 | 1/2002 | |
| EP | 2922071 A1 * | 9/2015 | H02K 1/17 |

* cited by examiner

Fig. 6

POLE PIECE FOR A TORQUE MOTOR

FOREIGN PRIORITY

This application claims priority to European Patent Application No. 17461600.3 filed Sep. 8, 2017, the entire contents of which is incorporated herein by reference.

FIELD

The present disclosure relates generally to a pole piece for a torque motor, and more generally to a torque motor incorporating the pole piece and methods of manufacturing a pole piece for a torque motor.

BACKGROUND

Torque motors are known in the art and are configured to produce a torque in order to rotate or move a shaft (e.g., a jet pipe) so as to operate a valve, for example a valve used in a direct drive or pneumatic field, such as an electrohydraulic servo-valve.

Figure 1A:
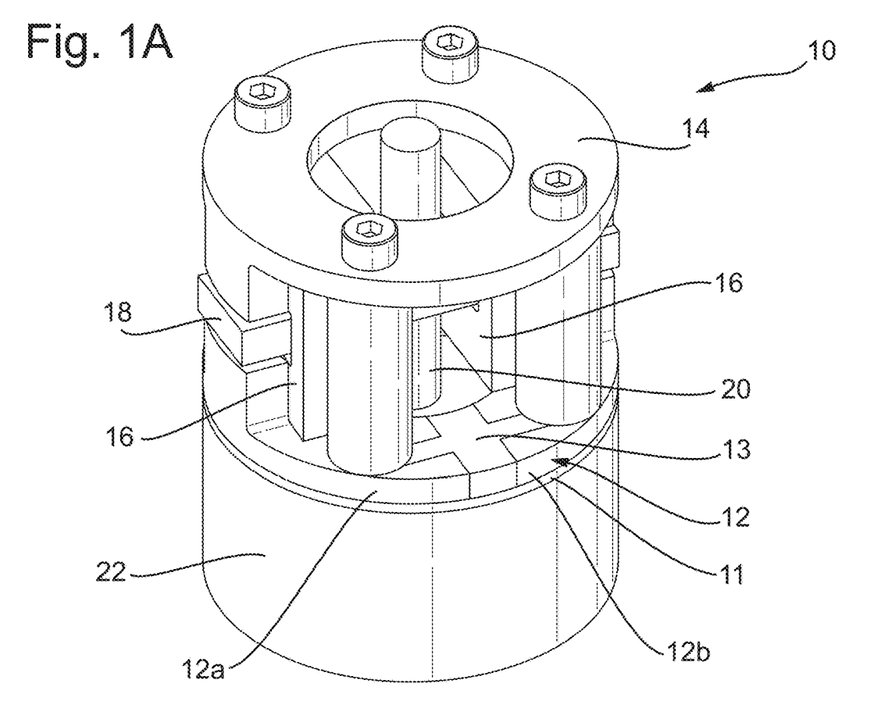
FIGS. 1A and 1B show conventional arrangements of a torque motor and pole piece for illustrative purposes only.

An example of a torque motor 10 is shown in FIG. 1A (which is provided for illustrative purposes only), and comprises a lower pole piece 12 and an upper pole piece 14, two sets of coils 16, an armature 18 that is pivotally located within the structure of the torque motor 10. The pivoting armature 18 is connected to a shaft 20, a lower end of which (not shown) is configured to move (e.g., left and right) upon rotation of the armature 18. In use, the movement of the lower end of the shaft 20 (e.g., jet pipe) may be used to operate a valve and/or control fluid flow of various types, and other applications as well.

To ensure high performance of the torque motor 10, the components that are used to create the magnetic field around the armature 18 must be manufactured to a high precision, and such that the clearances between the various magnetic parts (e.g., the lower and upper pole pieces 12, 14, the coils 16 and the armature 18) are as small as possible.

To assemble the torque motor 10, the lower pole piece 12 may be opened or divided into two separate parts 12a, 12b, and an additional part 13, called a magnetic shunt, may be used to connect the separate parts 12a, 12b of the lower pole piece 12 when assembling the torque motor 10.

The geometrical features associated with the connections between the separate parts 12a, 12b of the lower pole piece 12 and the magnetic shunt 13 have to be manufactured with a high precision, but also to allow for the change of the material properties caused by stresses in use. This means, for example, that an interference or press fit may not be used due to potential changes of the material properties; therefore, even with high precision methods that use tight tolerances, there will typically be gaps present between these parts.

Figure 1B:
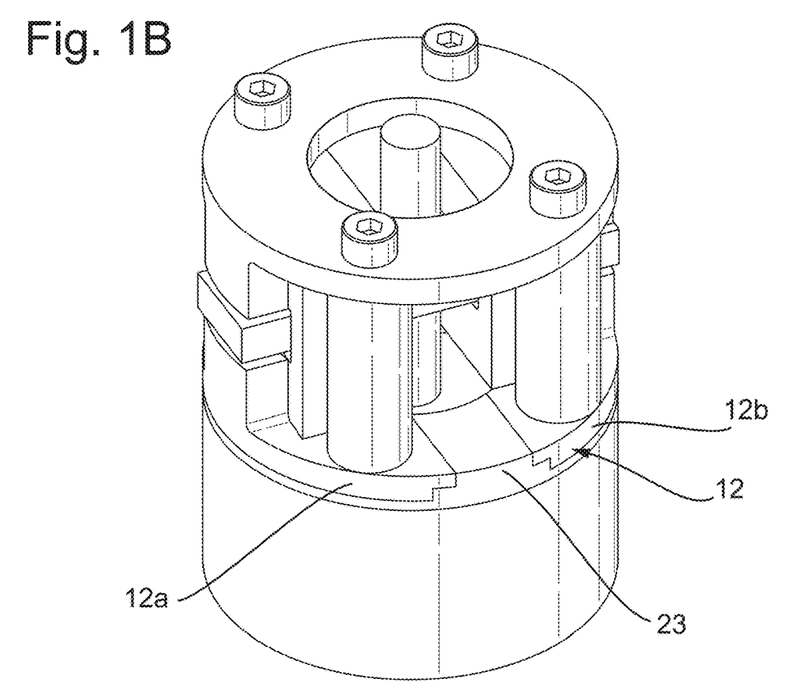

In the embodiment of FIG. 1A, a setting shim 11 may be provided in order to connect the various parts of the torque motor 10 to a housing 22. In an alternative background embodiment, as shown in FIG. 1B (also provided for illustrative purposes only), a component 23 may be provided that forms a combined magnetic shunt and setting shim. In this embodiment, the same issues may occur, in that the various components must be manufactured with tight tolerances, but may not be provided with an interference or press fit.

It is desired to provide an improved pole piece for a torque motor.

SUMMARY

In accordance with an aspect of the disclosure, there is provided a pole-piece for a torque motor, the pole-piece comprising a first section and a second section, wherein the first section and the second section are configured to abut each other to form one or more lines of abutment on an outer surface thereof, and each line of abutment follows an S- or Z-shape when the first section abuts the second section.

The first and second sections may be formed by cutting a piece of magnetic material into the first and second sections and then bringing them into abutment with each other, wherein each line of abutment may correspond to a single and/or continuous cut in the piece of magnetic material.

In accordance with an aspect of the disclosure, there is provided a method of manufacturing a pole-piece for a torque motor, the method comprising:
providing a single-piece of magnetic material; and
cutting the single-piece of magnetic material along one or more lines to form a first section separate from a second section, wherein the lines follow an S- or Z-shape.

Using an S- or Z-shape for the lines of contact reduces the magnetic losses between the first section and the second section, whilst providing a secure connection between the two sections.

The first section and the second section may be formed separate from each other, such that they may be two separate pieces. In use, the first section may be configured to be brought into abutment or contact with the second section.

One or more abutment surfaces of the first section may each configured to abut one or more complementary abutment surfaces of the second section when the first section abuts the second section, so as to form the one or more lines of abutment in an outer (e.g., upper or lower) surface of the pole piece. The complementary abutment surfaces may be "mirror images" of each other.

Figure 3:
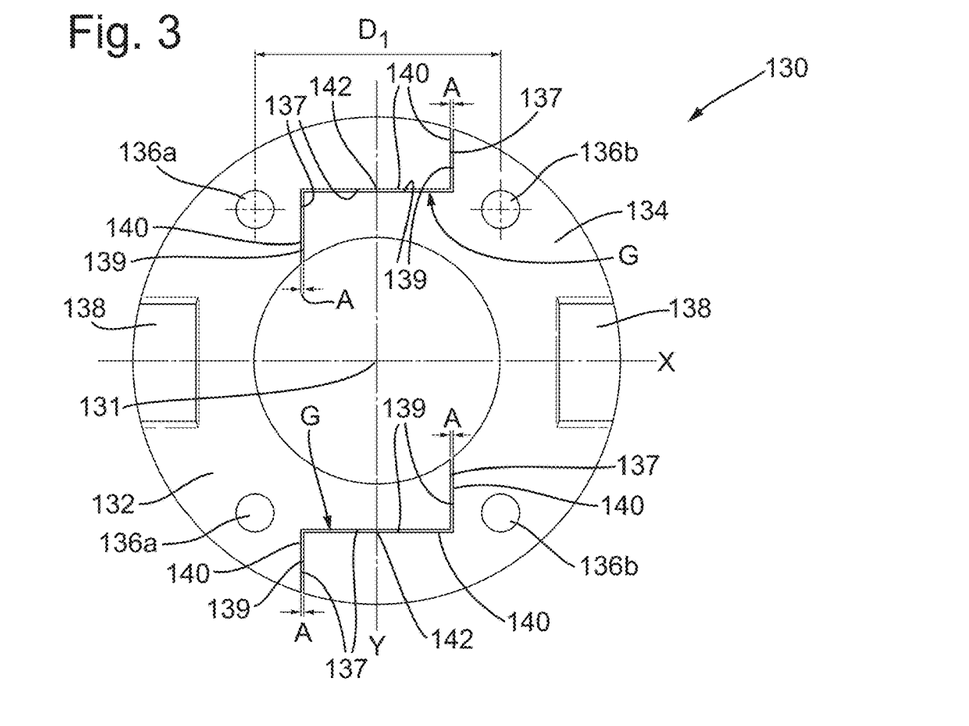
FIG. 3 shows the pole piece of the embodiment of FIG. 2A after being cut and during manufacture of the pole piece.
Figure 4:
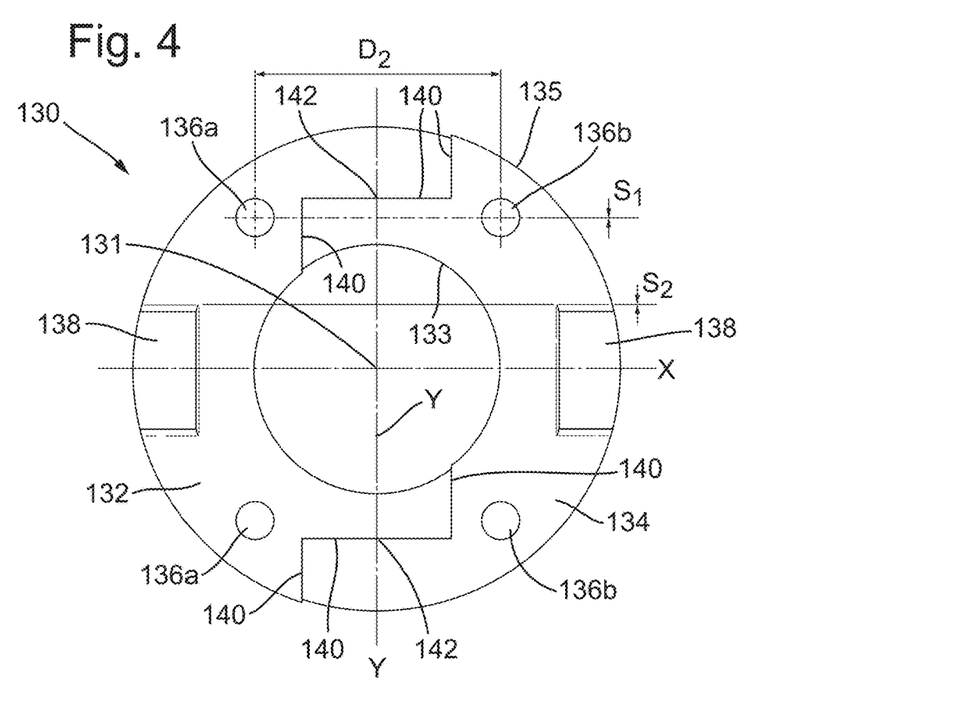
FIG. 4 shows the pole piece of the embodiment of FIG. 2A when the two portions thereof are pushed together.

There may be two lines of abutment, each located on opposed sides of the pole-piece. The shape of each line of abutment may be substantially the same. The first section may have substantially the same shape, layout, area, and/or volume as the second section. The first section may be a "mirror image" of the second section (as shown in FIGS. 3 and 4). The thickness of the pole-piece, the first section and/or the second section at the lines of abutment may be constant or uniform, and/or may be less than, for example at least 5 or 10 times less than a diameter or length (e.g., a longest diameter or length) of the pole-piece.

The lines of abutment may be located on opposite sides of the pole-piece, for example on opposed sides of a line bisecting the pole piece.

Each line of abutment may be rotationally symmetric about a midpoint of the line of abutment. The midpoint of the line of abutment may be a point located half-way along the length of the line of abutment, e.g., as measured as one travels along the line of abutment from one end to the other. The midpoint may be defined as a point that is located substantially halfway along the line of abutment.

The lines of abutment may have a translational symmetry with each other.

The pole-piece may further comprise one or more raised portions, which may be configured to be located above or below an armature of the torque motor in use. The lines of abutment may not pass through, contact or coincide with the raised portions.

In accordance with an aspect of the disclosure, there is provided a torque motor comprising a pole-piece as described above.

The torque motor may further comprise an armature having a longitudinal axis. The lines of abutment may be substantially parallel and/or perpendicular to the longitudinal axis of the armature.

An abutment surface may be formed by a plurality of surface sections. For example, each abutment surface may be formed by three surface sections such that the line of abutment forms a Z-shape.

In other words, each line of abutment may be a Z-shape comprising a first section, a second section and a third section. The first section may run substantially perpendicular to the longitudinal axis of the armature. The second section may run substantially parallel to the longitudinal axis of the armature. The third section may run substantially perpendicular to the longitudinal axis of the armature. Each line of abutment may consist of the first, second and third sections. The second section may connect the first section and the third section. The first section may, at one end, coincide with a first edge of the pole-piece, and at an opposite end coincide with a first end of the second section. The third section may, at one end, coincide with a second edge of the pole-piece (opposite to the first edge) and at an opposite end coincide with a second end of the second section (opposite to the first end). The line of abutment at the first section and/or the second section and/or the third sections may be straight.

Each line of abutment may be an S-shape comprising a single wavy line in the form of an "S" extending from an inner surface of the pole piece (e.g., an inner radial and/or circumferential surface) to an outer surface of the pole piece (e.g., an outer radial and/or circumferential surface). The single wavy line may be formed by a single abutment surface of the first section abutting a complementary abutment surface of the second section.

The lines of abutment may be located on opposite sides of the longitudinal axis of the armature.

The method described above may further comprise:

calculating a distance that the second section will need to move to abutment the first section after the cutting step; and positioning features on the single-piece of magnetic material, prior to cutting, so that they are not aligned before the cutting, and then align after the cutting and upon moving the first section into abutment with the second section.

The distance may correspond to a gap between the first section and the second section. The gap may be formed by removing material during the cutting step.

The features may be corresponding features that are located on both the first section and the second section. The features may comprise the raised portions described above, e.g., configured to be located above or below an armature of the torque motor in use.

BRIEF DESCRIPTION OF THE DRAWINGS

Various embodiments will now be described, by way of example only, and with reference to the accompanying drawings in which.

DETAILED DESCRIPTION

Figure 2A:
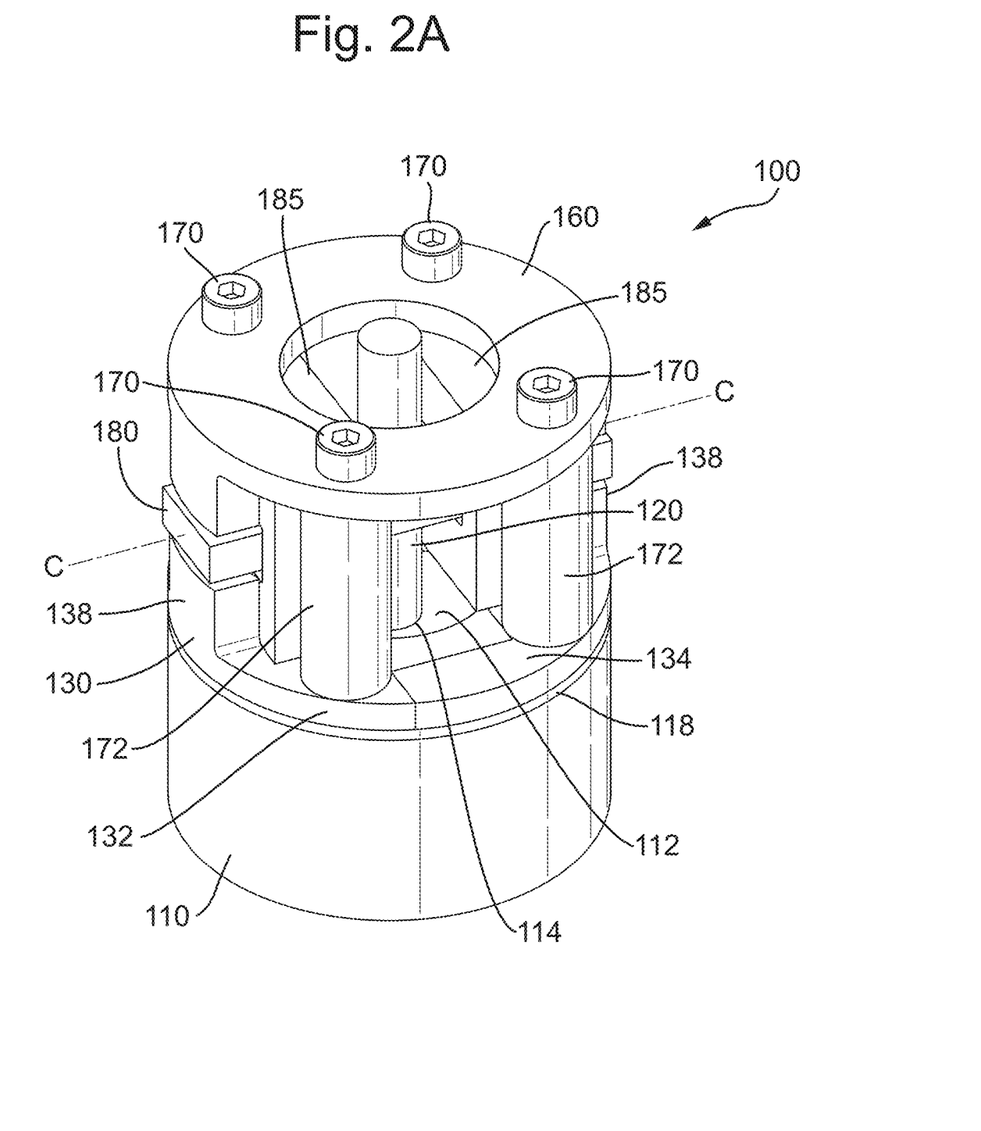
FIGS. 2A and 2B shows an embodiment of a torque motor in accordance with the present disclosure.
Figure 2B:
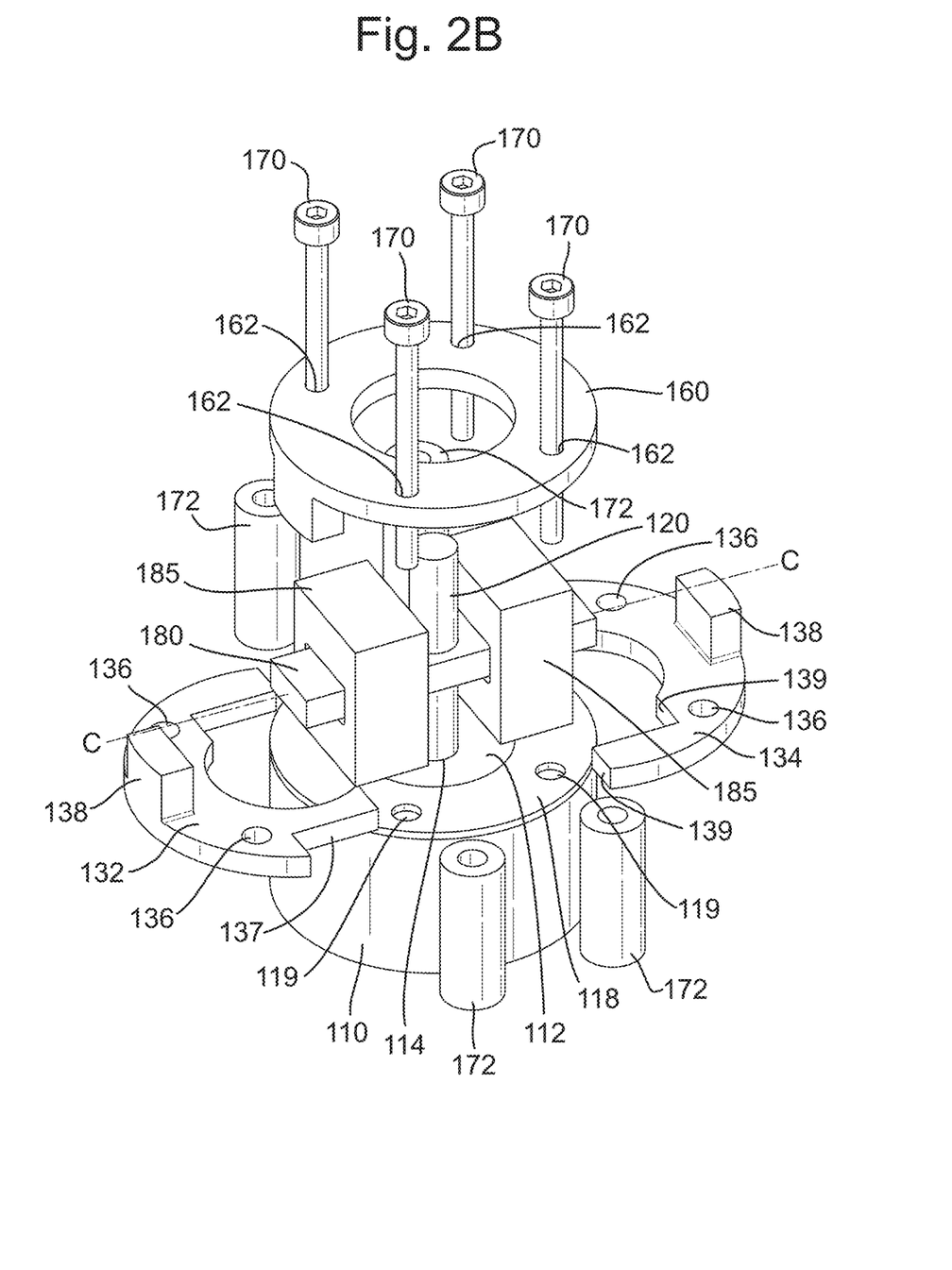

FIGS. 2A and 2B shows an embodiment of a torque motor 100 in accordance with the present disclosure in assembled form (FIG. 2A) and exploded form (FIG. 2B).

The torque motor 100 sits on a housing 110 that may contain various components (not shown) for operating a valve and/or controlling fluid flow of various types, as is known in the art. The housing 110 may comprise an upper surface or platform 112 upon which the various components of the torque motor 100 are placed, which upper surface 112 comprises an aperture 114, through which may extend a shaft 120 of the torque motor 100. The shaft 120 may form part of, for example, a jet pipe assembly for use in an electrohydraulic servo-valve. The torque motor 100 may also be used in other applications such as a flapper—nozzle structure, a direct drive valve or pneumatic valve, or the like. A detailed description of such applications, e.g., a jet pipe assembly is not provided herein, since a skilled person will have adequate knowledge of the construction and function of such applications.

A shim 118 may be disposed upon the upper surface 112 of the housing 110 and may be used for connecting the various components of the torque motor 100 to the housing 110, and allow easy adjustment thereof. The shim 118 also provides desired operational characteristics and stability of the torque motor 100.

The torque motor 100 comprises a lower pole piece 130 that is split into two separate sections or portions 132 and 134, which will be described in more detail below. The torque motor 100 further comprises an upper pole piece 160 that may be formed as a single piece (e.g., in contrast to the lower pole piece 130). The lower pole piece 130 may form a substantially annular member in use.

The upper pole piece 160 and the lower pole piece 130 may be connected to the housing 110 through the shim 118 via fasteners 170, which are configured to fasten these components to the housing 110. Spacers 172 may be provided, and configured to separate the upper pole piece 160 from the lower pole piece 130 when the fasteners 170 are fastened to the housing 110. The fasteners 170 are configured to extend through a plurality of (e.g., four) apertures 162 in the upper pole piece 160, as well as a plurality of (e.g., four) apertures 136 in the lower pole piece 130, and a plurality of (e.g., four) apertures 119 in the shim 118.

The torque motor 100 comprises an armature 180, which is configured to pivot or rotate in use as is known in the art. The armature 180 is connected to the shaft 120, such that a lower end of the shaft (not shown) may be configured to move (e.g., side-to-side) upon rotation of the armature 180. In use, the movement of the lower end of the shaft 120 may be used to operate a valve and/or control fluid flow of various types, and other applications, as discussed herein. The armature 180 may be cuboid and/or may comprise a longitudinal axis C (as shown in FIGS. 2A and 2B).

Surrounding the armature 180 are a pair of electromagnetic coils 185, which may be energised in use to cause the armature 180 to pivot or rotate to actuate the torque motor 100. The coils 185 are disposed so that opposite arm portions of the armature 180 extend through the coils 185. When an electrical signal is applied to the coils 185, the magnetic forces generated cause the armature 180 to pivot or rotate as aforesaid.

FIG. 3 shows the lower pole piece 130 in isolation and comprising a first portion 132 and second portion 134. In FIG. 3, the lower pole piece 130 is shown immediately after it has been cut from a single piece of material. As is evident, after cutting, the first portion 132 is separated from the second portion 134 by a gap G. The gap G has a width A corresponding to the width of material removed from the lower pole piece 130 during cutting.

The cutting lines 140 may be referred to as lines of abutment 140 once the two portions 132, 134 are brought into abutment or contact (e.g., in use). In some embodiments, the two separate portions 132, 134 may not be formed by cutting, but may be manufactured from separate pieces of material.

One or more abutment surfaces 137 of the first portion 132 and one or more abutment surfaces 139 of the second portion 134 may be formed, e.g., by the cutting step. Each line of abutment 140 may correspond to a line formed on the outer (e.g., upper or lower) surface of the pole piece when an abutment surface 137 of the first portion 132 is brought into abutment with a respective or complementary abutment surface 139 of the second portion 134.

Each line of abutment 140 may correspond to a single cut through the single piece of material.

The pole piece may be ring-shaped and comprise a radially inner circumferential surface 133 and a radially outer circumferential surface 135, wherein each abutment surface 137, 139 (and therefore each line of abutment 140) may extend from the inner circumferential surface 133 to the outer circumferential surface 135. As described herein, the abutment surfaces 137, 139 (and lines of abutment 140) are configured such that the lines of abutment 140 follow or form an S- or Z-shape when the first portion 132 and the second portion 134 contact each other.

Figure 5:
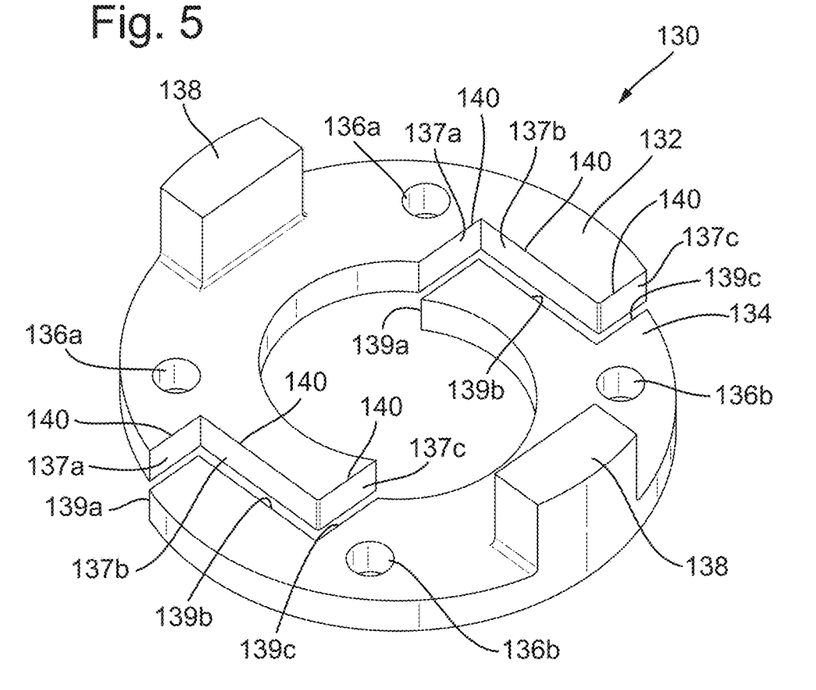
FIG. 5 shows a perspective view of the pole piece of the embodiment of FIG. 2A.
Figure 6:
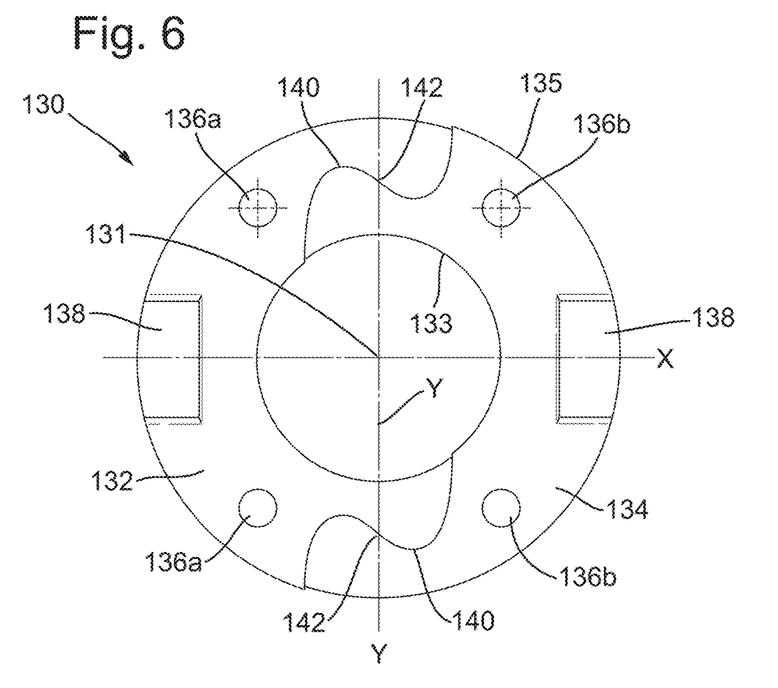
FIG. 6 shows a pole piece according to an embodiment of the present disclosure.

An abutment surface 137, 139 may be formed by a plurality of surface sections. For example, as shown in FIG. 5, the abutment surface 137 may be formed by three surface sections 137a, 137b and 137c, and the abutment surface 139 may be formed by three surface sections 139a, 139b and 139c. In the embodiment of FIG. 6, a single abutment surface is defined for each of the first portion 132 and the second portion 134, due to the use of an S-shape instead of a Z-shape.

An XY axis may be defined, as shown in FIGS. 3 and 4, wherein the X direction may correspond to (e.g., be coincident or parallel with) the longitudinal axis C of the armature 180 in use, and the Y direction may be perpendicular to the longitudinal axis C of the armature 180. The X and Y axes may intersect at a midpoint 131 of the lower pole piece 130 and may be perpendicular to each other.

Certain features of the second portion 134 may be shifted from corresponding features on the first portion 132 by a distance A that corresponds to the width A of the gap G. The distance A may be the distance that the second section 134 will need to move to contact the first section 132 after the cutting step, and may be calculated or determined prior to cutting. This distance is calculated so that, upon moving the second portion 134 into contact with the first portion 132 (as shown in FIG. 4), these corresponding features come into alignment.

For example, the apertures 136b on the second portion 134 may be shifted by a distance A from the apertures 136a located on the first portion 132 (e.g., in the Y direction), which distance A corresponds to the width A of the cutting lines 140 (e.g., in the Y direction), and the distance that the second section 134 will need to move to contact the first section 132 after the cutting step, as shown in FIG. 3.

Upon moving the second portion 134 into contact with the first portion 132, the second portion 134 shifts by the distance A (e.g., in the X and Y directions) such that the apertures 136b of the second portion 134 come into alignment with those of the first portion 132, as shown in FIG. 4, such that, e.g., the distance $S_1$ separating the apertures 136a, 136b (e.g., in the Y direction) is zero.

The lower pole piece 130 may also comprise raised portions 138 located at opposite ends of the lower pole piece 130, and configured to be located below the axial ends of the armature 180 in use. As shown in FIG. 3, the raised portion 138 of the second portion 134 of the lower pole piece 130 may be offset from the raised portion 138 of the first portion 132 of the lower pole piece 130 by the distance A (e.g., in the Y direction), before the lower pole piece 130 is cut from a single piece of material.

Upon moving the second portion 134 into contact with the first portion 132, the raised portion 138 of the second portion 134 will shift by the distance A (e.g., in the Y direction) such that the raised portion 138 of the second portion 134 becomes aligned with that of the first portion 132, such that, e.g., the distance $S_2$ separating the raised portions 138 (e.g., in the Y direction) is zero.

Before the lower pole piece 130 is cut from the single piece of material, as shown in FIG. 3, the apertures 136b of the second portion 134 may be located a distance $D_1$ from the apertures 136a of the first portion 132 (e.g., in the X direction), and the distance $D_1$ may be equal to a first distance d+A.

Once the second portion 134 has been moved into contact with the first portion 132, as shown in FIG. 4, the apertures 136b of the second portion 134 may be located a distance $D_2$ from the apertures 136a of the first portion 132 (e.g., in the X direction), and the distance $D_2$ may be equal to a second distance d, which is equal to the first distance minus the width A of the cutting lines 140.

The lines of abutment 140 may be orientated parallel or perpendicular to the X and Y axes (e.g., the longitudinal axis C of the armature 180 in use), as shown in FIGS. 3 and 4. For example, the lines of abutment 140 may be parallel to one or other of the X and Y axes throughout their entire length. This may provide an optimum transfer of magnetic flux through the lower pole piece 130, whilst providing a simple method of manufacture, and positioning of the features of the lower pole piece 130 on the single piece of material prior to cutting. That is, the gap G created during the cutting may be taken into account when manufacturing the original single piece of material from which the lower pole piece 130 is formed.

The lines of abutment 140 may be termed lines of contact, to indicate that, although the first section 132 and the second section 134 may abut along this line, they may also be in contact along the line.

Although the lines of abutment 140 are shown as being parallel or perpendicular to the longitudinal axis C of the armature 180, various embodiments are contemplated in which the lines of abutment 140 may be slightly different, for example an S-shape, whilst still providing technical effects not achieved by conventional arrangements. Such an embodiment is shown in FIG. 6, in which like reference numerals indicate similar features as shown and described in respect of FIG. 4.

For example, the shape of each line of abutment 140 may be substantially the same on either side of the lower pole piece 130 (e.g., on either side of the X axis). Each line of abutment 140 may, additionally or alternatively, be rotationally symmetric about a midpoint 142 of the line of abutment 140, the midpoint 142 being defined as a point that is located substantially halfway along the line of abutment 140 (e.g., when moving or travelling along the line of abutment 140 from one end to the other). The midpoint 142 may coincide with the Y axis.

The lines of abutment 140 may have translational symmetry with each other. The lines of abutment 140 may also comprise a number of distinct sections, e.g., corresponding to the different surface sections of the abutment surfaces, wherein the sections may be at 90 degree angles with respect to each other, as shown in FIGS. 3 and 4.

The lower pole piece 130 may be made by a precise cutting method, for example using electrical discharge machining ("EDM"), waterjet or abrasive cutting (e.g., with an abrasive substance contained within a jet of water) from a single piece of material. As described above, and to ensure proper geometry of the lower pole piece 130 after cutting, the features located on one portion of the lower pole piece 130 may be shifted from those of the other portion of the lower pole piece 130 by the width of the cut (see distance A in FIGS. 3 and 4).

Technical effects of the embodiments disclosed herein include an improved performance of the torque motor by reduction of magnetic losses created by separating the lower pole piece 130 into two portions, for example by using an S- or Z-shape line of abutment. It has been found that magnetic shunts are not needed when using the technology of the present disclosure, which reduces the risk of magnetic saturation and further reduces magnetic losses. This also reduces the cost of the lower pole piece 130, since a magnetic shunt is not required to be manufactured. The method of manufacturing a lower pole piece in accordance with the embodiments described above is also repeatable in a reliable manner.

FIG. 5 shows a perspective view of the lower pole piece 130, and in an exploded form, from which the shape of the lines of abutment 140 can be seen in detail. As will be appreciated, upon connecting the first and second portions 132, 134 of the lower pole piece 130 together, the apertures 136 and raised portions 138 of the lower pole piece 130 align with each other to form a symmetric piece formed by the combination of the first and second portions 132, 134. FIG. 5 also shows the surface sections 137*a-c*, 139*a-c* that form each respective abutment surface 137, 139 of the first and second portions 132, 134, respectively.

Although the present invention has been described with reference to preferred embodiments, it will be understood by those skilled in the art that various changes in form and detail may be made without departing from the scope of the invention as set forth in the accompanying claims.

The invention claimed is:

1. A method of manufacturing a pole-piece for a torque motor, the method comprising:
   providing a single-piece of magnetic material;
   cutting the single-piece of magnetic material along one or more lines in an outer surface thereof to form a first section separate from a second section, wherein the lines follow an S- or Z-shape;
   calculating a distance (A) that the second section will need to move to contact the first section after the cutting step; and
   positioning features on the single-piece of magnetic material, prior to cutting, so that they are not aligned before the cutting, and then align after the cutting and upon moving the first section into contact with the second section.

2. A method as claimed in claim 1, wherein the distance (A) corresponds to a gap (G) between the first section and the second section, wherein the gap (G) is formed by removing material during the cutting step.

3. A method as claimed in claim 1, wherein the features are corresponding features that are located on both the first section and the second section.

* * * * *